(12) United States Patent
Kizer et al.

(10) Patent No.: US 9,237,045 B2
(45) Date of Patent: Jan. 12, 2016

(54) SYSTEM AND METHOD FOR INTERNAL AC COUPLING WITH ACTIVE DC RESTORE AND ADJUSTABLE HIGH-PASS FILTER FOR A PAM 2/4 RECEIVER

(71) Applicant: Avago Technologies General IP (Singapore) Pte. Ltd., Singapore (SG)

(72) Inventors: Jade Michael Kizer, Windsor, CO (US); Robert M. Thelen, Fort Collins, CO (US); Robert H. Miller, Jr., Loveland, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 256 days.

(21) Appl. No.: 13/835,509

(22) Filed: Mar. 15, 2013

(65) Prior Publication Data
US 2014/0269998 A1   Sep. 18, 2014

(51) Int. Cl.
*H04L 25/06*   (2006.01)

(52) U.S. Cl.
CPC ..................................... *H04L 25/06* (2013.01)

(58) Field of Classification Search
CPC ...... H03L 2207/06; H03L 7/093; H04L 25/06
See application file for complete search history.

(56) References Cited

U.S. PATENT DOCUMENTS

| 6,417,727 | B1 * | 7/2002 | Davis ............................ 327/553 |
| 6,492,876 | B1 * | 12/2002 | Kamal et al. .................. 330/304 |
| 7,738,567 | B2 | 6/2010 | Miller et al. |
| 8,121,183 | B2 | 2/2012 | Zhong et al. |
| 8,477,833 | B2 * | 7/2013 | Bulzacchelli et al. ........ 375/233 |
| 2003/0227571 | A1 * | 12/2003 | Movshovish et al. ......... 348/691 |
| 2005/0069394 | A1 * | 3/2005 | Dyer et al. ...................... 410/84 |
| 2008/0144742 | A1 * | 6/2008 | Sonntag et al. ............... 375/319 |
| 2008/0232512 | A1 * | 9/2008 | Rofougaran et al. ......... 375/319 |
| 2008/0297957 | A1 * | 12/2008 | Mehas et al. .................... 361/18 |
| 2011/0142120 | A1 | 6/2011 | Liu et al. |
| 2012/0140812 | A1 | 6/2012 | Ho et al. |
| 2012/0201289 | A1 | 8/2012 | Abdalla et al. |
| 2012/0224621 | A1 | 9/2012 | Stojanovic et al. |
| 2013/0176269 | A1 * | 7/2013 | Sobel et al. .................... 345/174 |

OTHER PUBLICATIONS

Shaolei Quan et al., A 1.0625-to-14.025Gb/s Multimedia Transceiver with Full-rate Source-Series-Terminated Transmit Driver and Floating-Tap Decision-Feedback Equalizer in 40 nm CMOS; ISSCC 2011 / Session 20 / High-Speed Transceivers & Building blocks / 20.2; IEEE International Solid-State Circuits Conference; pp. 348-350; 2011.

Howard Frazier, et al., Feasibility of 100 Gb/s Operation on Installed Backplane Channels; May 2011.

Vladimir Stojanovic et al., Autonomous Dual-Mode (PAM2/4) Serial Link Transceiver With Adaptive Equalization and Data Recovery; IEEE Journal of Solid State Circuits; vol. 40, No. 4, pp. 1012-1026; Apr. 2005.

(Continued)

*Primary Examiner* — Kenneth Lam

(57) ABSTRACT

A receiver termination circuit includes an internal AC coupling capacitor and an adjustable resistor forming an adjustable high-pass filter (HPF) at a receiver side of a transmission medium, and a digital-to-analog converter (DAC) coupled to the adjustable HPF, the DAC configured to provide a signal having a low-pass filter response to the adjustable HPF to provide a DC restore function.

21 Claims, 7 Drawing Sheets

(56) References Cited

OTHER PUBLICATIONS

PAC Opto data sheet, 1000BASE-T Copper Transceiver; pp. 1-7; 2012.

Vladimir Stojanovic et al., Adaptive Equalization and Data Recovery in a Dual-Mode (PAM2/4) Serial Link Transceiver; 2004 Symposium on VLSI Circuits Digest of Technical Papers, pp. 348-351; 2004.

* cited by examiner

SYSTEM AND METHOD FOR INTERNAL AC COUPLING WITH ACTIVE DC RESTORE AND ADJUSTABLE HIGH-PASS FILTER FOR A PAM 2/4 RECEIVER

BACKGROUND

A modern application specific integrated circuit (ASIC) must meet very stringent design and performance specifications. One example of an ASIC is a circuit element referred to as a serializer/deserializer (SERDES). As its name implies, a SERDES converts a parallel bit stream to a high speed serial bit stream, transmits it across a channel, then the serial bit stream is converted back to a parallel bit stream. A typical SERDES is organized into blocks of transmitters and receivers having digital to analog conversion (DAC) functionality and analog to digital conversion (ADC) functionality. Normally, the receivers and transmitters operate on differential signals. Differential signals are those that are represented by two complementary signals on different conductors, with the term "differential" representing the difference between the two complementary signals. All differential signals also have what is referred to as a "common mode," which represents the average of the two differential signals. High-speed differential signaling offers many advantages, such as low noise and low power while providing a robust and high-speed data transmission.

Typically, it is desirable that high-speed differential input/output circuits (also referred to as input/output buffers, receiver/transmitter circuits, or receiver/driver circuits) use some form of differential and common mode termination (e.g., a resistive load) to match the differential impedance of the transmission medium (or channel). The transmission medium (e.g., printed-circuit board traces, transmission lines, backplanes, a differential wire pair, or cables) couples the transmitter output circuit to the receiver input circuit and provides a path along which the intended information travels.

In the past, a SERDES receiver was implemented using an external alternating current (AC) coupling capacitor. This is primarily done to isolate the DC signal levels between transmit and receive portions of the circuitry. The external AC coupling capacitor was connected to the transmission medium that connected the SERDES transmitter circuitry to the SERDES receiver circuitry. The external AC coupling capacitor had a typical value on the order of 10-100 nanofarads (nF). However, these external AC coupling capacitors contribute to parasitic losses and it is preferable to have them fabricated as part of the SERDES circuitry. However, an external AC coupling capacitor is generally too large to integrate onto the die using the same process used to fabricate the chip and is therefore typically located on a circuit board that houses the transmission medium.

Unfortunately, integrating an AC coupling capacitor having a value on the order of 10-100 nanofarads (nF) is very difficult using modern SERDES integrated circuit processing technologies. Making an internal AC coupling capacitor that can be fabricated as part of the die or chip presents design limitations due to the size and parasitic limitations of the capacitor. Moreover, these drawbacks become more pronounced when attempting to design and fabricate a receiver that can operate using both PAM 2 and PAM 4 modalities. The acronym PAM refers to pulse amplitude modulation, which is a form of signal modulation where the message information is encoded into the amplitude of a series of signal pulses. PAM is an analog pulse modulation scheme in which the amplitude of a train of carrier pulses is varied according to the sample value of the message signal. A PAM 2 communication modality refers to a modulator that takes one bit at a time and maps the signal amplitude to one of two possible levels (two symbols), for example −1 volt and 1 volt. A PAM 4 communication modality refers to a modulator that takes two bits at a time and maps the signal amplitude to one of four possible levels (four symbols), for example −3 volts, −1 volt, 1 volt, and 3 volts. For a given baud rate, PAM-4 modulation can transmit up to twice the number of bits as PAM-2 modulation.

FIG. 1 is a schematic diagram illustrating a conventional transmit driver and receiver termination network. The network 1 comprises a transmit (TX) portion 2 and a receive (RX) portion 4 connected by a transmission medium 21 comprising transmission line segments 22, 23, 24 and 25. In an embodiment, the transmission line segments 22, 23, 24 and 25 are adapted to transfer a differential signal. The transmit portion 2 comprises a transmit driver 6 and a transmit driver 8. The transmit drivers 6 and 8 deliver a differential transmit signal to resistors 7 and 9, respectively.

The output of the resistor 7 is provided to a transmission line segment 22 and the output of the resistor 9 is provided to a transmission line segment 24. The characteristic impedance of the transmission line segments is "$Z_0$" and in an embodiment, can be 50 ohms. The transmission line segments 22 and 23 are connected by a capacitor 15 and the transmission line segments 24 and 25 are connected by a capacitor 16. The transmission line segments 24 and 25 also have a characteristic impedance of 50 ohms.

The signal INP is the positive transmit signal, also referred to as an input signal, provided to a receiver 13. The signal INN is the negative transmit signal, also referred to as an input signal, provided to a receiver 14. The terms "positive" and "negative" are relative because the signals INP and INN represent the components of a differential signal that exist around the common mode voltage, Vcm. A receiver termination resistor 11 terminates the INP signal to an AC ground; and a receiver termination resistor 12 terminates the INN signal to an AC ground. The values of the resistors 7, 9, 11 and 12 are chosen to represent the impedance of the transmission medium 21, comprising transmission line segments 22, 23, 24 and 25, respectively, which separate the transmit portion 2 from the receive portion 4 by a distance. The external AC coupling capacitors 15 and 16 are inserted into the transmission medium 21 to isolate the DC signal levels between transmit and receive circuitry, but create discontinuities in the transmission medium 21. In an embodiment, the value of each resistor 11 and 12 is nominally 50 ohms and the value of the external AC coupling capacitors is on the order of 10-100 nF.

FIG. 2 is a diagram illustrating an output signal of the transmitter drivers of FIG. 1. The output signal from the transmit drivers 6 and 8 is one where the common mode voltage is Vcm and is measured at the receiver inputs as:

$$VCM = \frac{INN + INP}{2} \qquad \text{Eq. 1}$$

The external capacitors 15 and 16 create discontinuities in the transmission medium 21 and therefore, create noise in the system. This is in addition to the area, cost, and routability of inserting these "large" external AC caps into the system.

Therefore, it would be desirable to have a way to fabricate an internal AC coupling capacitor onto a SERDES receiver circuit.

SUMMARY

In an embodiment, a receiver termination circuit includes an internal AC coupling capacitor and an adjustable resistor forming an adjustable high-pass filter (HPF) at a receiver side of a transmission medium, and a digital-to-analog converter (DAC) coupled to the adjustable HPF, the DAC configured to provide a signal having a low-pass filter response to the adjustable HPF to provide a DC restore function.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

A system and method for internal AC coupling with active DC restore and adjustable high-pass filter for a PAM 2/4 receiver can be implemented in a SERDES receiver or in another receiver circuit in which it is desirable to minimize the effects of external AC coupling capacitors on the communication medium that connects a SERDES transmitter to a SERDES receiver.

Figure 1:
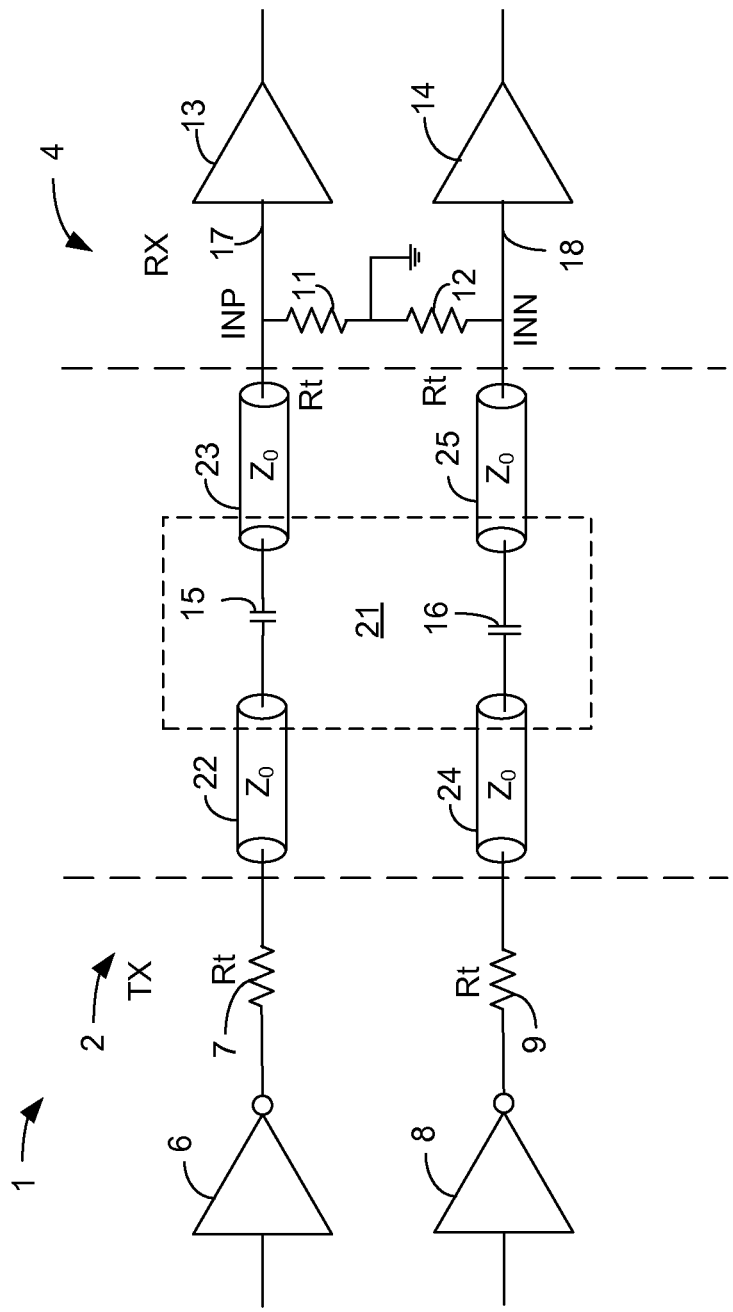
FIG. 1 is a schematic diagram illustrating a conventional transmit driver and receiver network.
Figure 2:
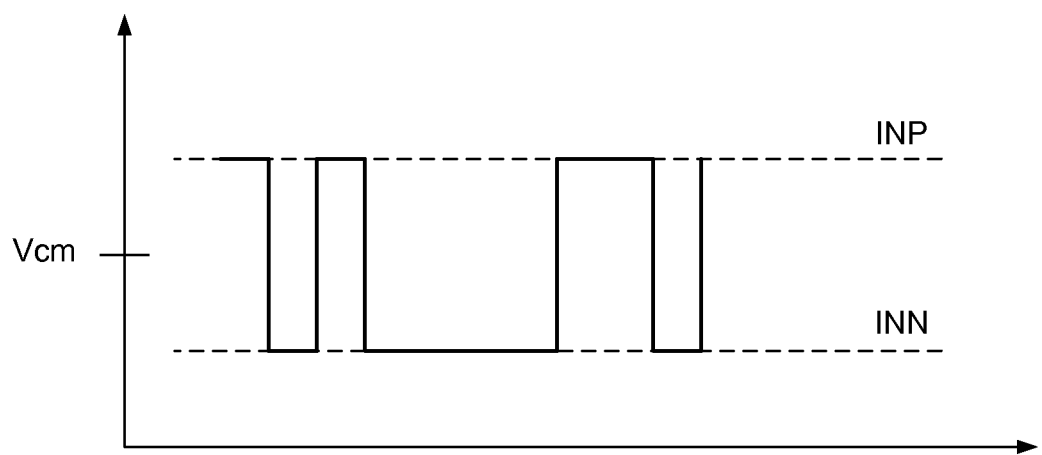
FIG. 2 is a diagram illustrating an output signal of the transmitter drivers of FIG. 1.
Figure 3:
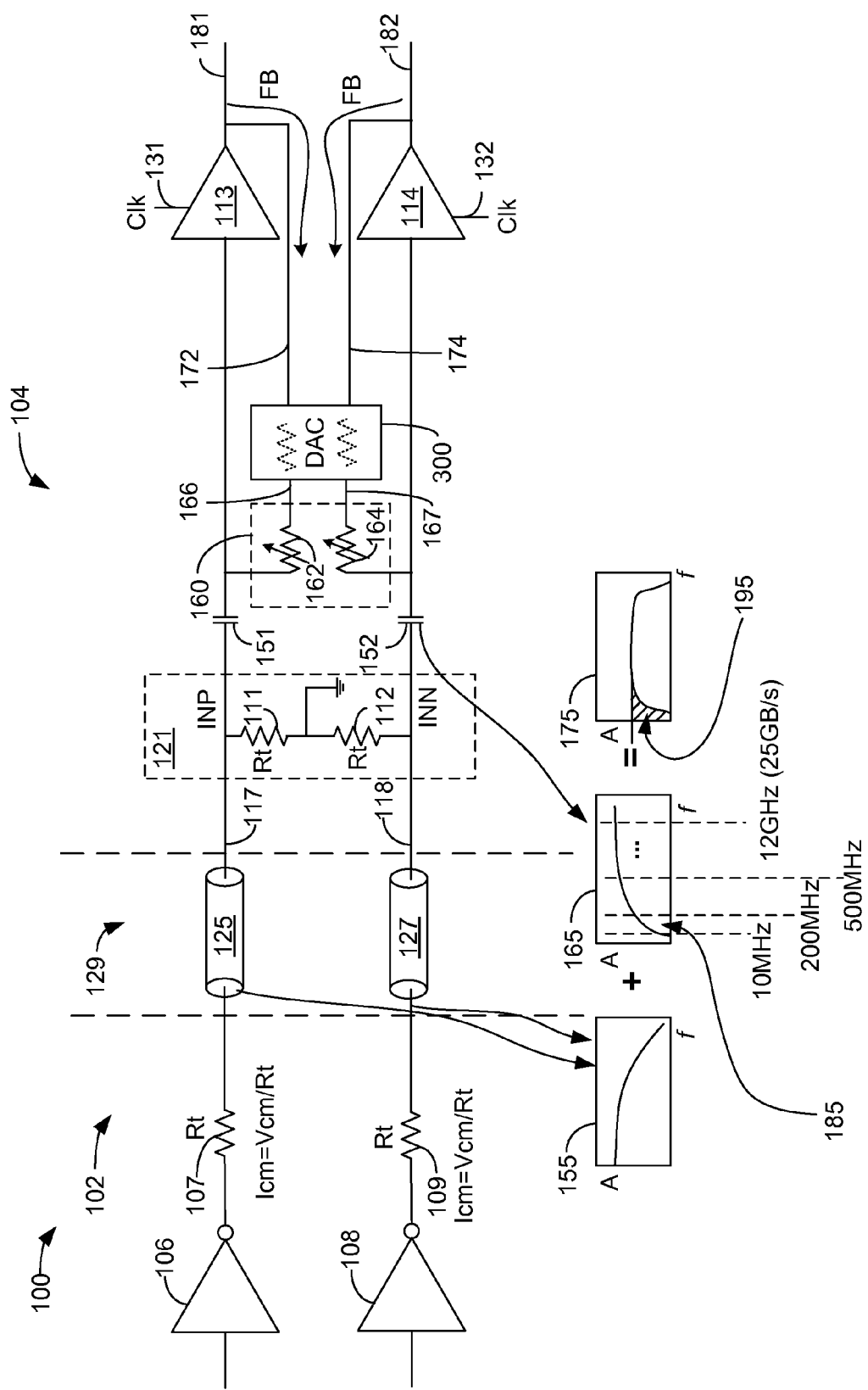
FIG. 3 is a schematic diagram illustrating a receiver termination network that includes internal AC coupling capacitors integrated as part of the receiver circuitry.

FIG. 3 is a schematic diagram illustrating an embodiment of a receiver termination network that includes internal AC coupling capacitors integrated as part of the receiver circuitry. FIG. 3 includes transmitter circuitry to the extent useful for describing the operation of the receiver circuitry. The network 100 comprises a transmit (TX) portion 102 and a receive (RX) portion 104 connected by a transmission medium 129 comprising differential transmission line segments 125 and 127. The RX portion 104 is connected to the transmission line segments 125 and 127 over connections 117 and 118, respectively. The transmit portion 102 comprises a transmit driver 106 and a transmit driver 108. The transmit drivers 106 and 108 deliver a differential transmit signal to resistors 107 and 109, respectively. The DC current through each resistor is given by Icm=Vcm/Rt, where Icm is the common mode transmit current, Vcm is the common mode voltage of the differential signals, and Rt is the value of the resistors 107 and 109.

The signal INP is the positive transmit signal, also referred to as an input signal, provided to a receiver 113. The signal INN is the negative transmit signal, also referred to as an input signal, provided to a receiver 114. The terms "positive" and "negative" are relative because the signals INP and INN represent the components of a differential signal that exist around the common mode voltage, Vcm. A receiver termination resistor 111 terminates the INP signal to an AC ground; and a receiver termination resistor 112 terminates the INN signal to an AC ground. The values of the resistors 111 and 112 are chosen to represent the impedance of the transmission medium 129, comprising transmission line segments 125 and 127, respectively, which separate the transmit portion 102 from the receive portion 104 by a distance. In an embodiment, the value of each resistor 111 and 112 is nominally 50 ohms.

The RX portion 104 comprises internal AC coupling capacitors 151 and 152, associated with the transmission line segments 125 and 127, respectively. In an embodiment, the internal AC coupling capacitors 151 and 152 are integrated with, formed in, or otherwise associated with the circuitry that is used to fabricate the receiver portion 104. In an embodiment, the value of the internal AC coupling capacitors 151 and 152 can be on the order of 100 femtofarads (fF).

The RX portion 104 also comprises an adjustable high-pass filter (HPF) 160 comprising adjustable resistors 162 and 164. The adjustable resistor 162 is connected to the transmission line segment 125 via connection 117 and internal AC coupling capacitor 151. The adjustable resistor 164 is connected to the transmission line segment 127 via connection 118 and internal AC coupling capacitor 152. The adjustable resistor 162 is connected to a DAC 300 over connection 166. The adjustable resistor 164 is connected to the DAC 300 over connection 167. In an embodiment, the DAC 300 can be implemented as a 10 bit DAC that uses an eight bit control word, effectively forming an eight bit DAC. However, other bit lengths are possible.

The DAC 300 is connected to the output of the receiver 113 over connection 172, and is connected to the output of the receiver 114 over connection 174. In this manner, the DAC 300 receives the complementary metal oxide semiconductor (CMOS) level logic output "d_t" of the receiver 113 over connection 172 and receives the CMOS level logic output "d_c" of the receiver 114 over connection 174 as feedback signals. A clock signal is provided to the receiver 113 over connection 131 and a clock signal is provided to the receiver 114 over connection 132.

The response of the transmission medium 129 is shown using the graph 155 and the response of the internal AC coupling capacitors 151 and 152 and HPF 160 is shown using the graph 165. The combination of these responses is shown using the graph 175. Relative amplitude is shown on the vertical axis and relative frequency is shown on the horizontal axis of the graphs 155, 165 and 175. In an embodiment, the operation of the DAC 300 provides a DC restore (DCR) function that has a low-pass filter response. The feedback signals on connections 172 and 174 are low-pass filtered signals. The low pass filtered signals are the recovered data being modulated back into the resistive termination network (resistors 162 and 164) and the internal AC coupling capacitors 151 and 152. To provide active DC restore functionality, the recovered receive signals are fed back over connections 172 and 174 and have a specific amplitude that is set by the DAC 300. An example of the amplitude can be 500 mVppd (millivolts, peak-to-peak), such that the signal in the region 195 corrects to 500 mV, which is the value of the DC signal in this example. The internal AC coupling capacitors 151 and 152 create a high-pass filter for the data on the transmission medium 129. The operation of the low-pass response of the DAC 300 creates low pass response adjustability in the general area 185 illustrated in the graph 165 with a high pass cutoff frequency set by the adjustable high-pass filter (HPF) 160. The area 195 shown in the graph 175 refers to the digital feedback provided by the DAC 300 "filling in" the data at frequencies in the range from DC to the high pass cutoff frequency set by the adjustable high-pass filter (HPF) 160. The adjustable nature of the low-pass characteristic provided by the DAC 300 changes the 3 dB frequency of area 195, thus providing the DC restore aspect, with the frequencies shown in the graph 165 for example only. The DAC 300 fills in the missing DC content that is lost by a passive resistive termination on the AC coupling capacitors 151 and 152 facing the receiver elements 113 and 114. Since the RC characteristic of the adjustable HPF 160 is adjustable by operation of the DAC 300 and the adjustable resistors 162 and 164, the mixing between HPF/LPF can be modulated together by controlling the output of the DAC 300.

Figure 4:
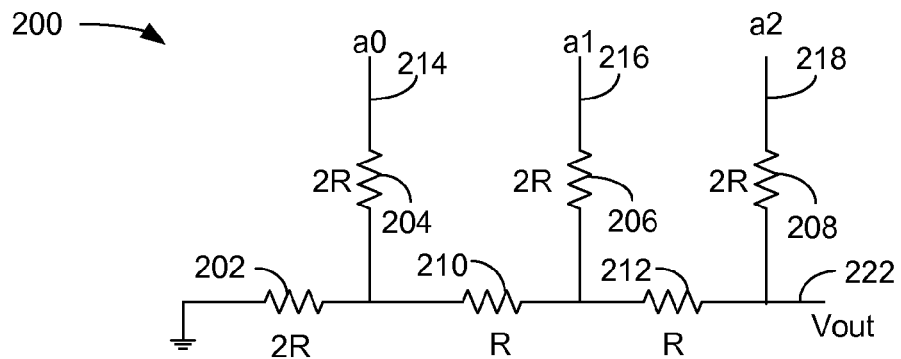
FIG. 4 is a schematic diagram illustrating an example 3 bit digital-to-analog converter (DAC) having an R2R architecture.

FIG. 4 is a schematic diagram illustrating an example 3 bit digital-to-analog converter (DAC) having an R2R architecture. The 3 bit DAC 200 comprises resistors 202, 204, 206, 208, 210 and 212, where the values of the resistors 210 and 212 are "R" and the values for the resistors 202, 204, 206 and 208 are "2R." A first bit "a0" is the least significant bit (LSB) input on connection 214, a second bit "a1" is input on connection 216 and a third bit "a2" is the most significant bit (MSB) and is input on connection 218. The bits a0, a1 and a2 are driven by digital logic gates (not shown) and are ideally switched between zero volts (logic 0) and Vref (logic 1). The R2R architecture causes the digital bits to be weighted in their contribution to the output voltage Vout. In this example, three bits are shown (bits 2-0) providing $2^3$ or 8 possible analog voltage levels at the output. Depending on which bits are set to logic 0 and which bits are set to logic 1 the output voltage be a corresponding stepped value between 0 volts and (Vref minus the value of the minimum step, bit0 (bit a2 in this example)). The actual value of Vref (and 0 volts) will depend on the type of technology used to generate the digital signals.

The value of Vout on connection 222 is given by:

Vout=Vref·VAL/$2^N$, where Vref=VDD, and where N=the number of bits and the term "VAL" is the digital input value.

Figure 5:
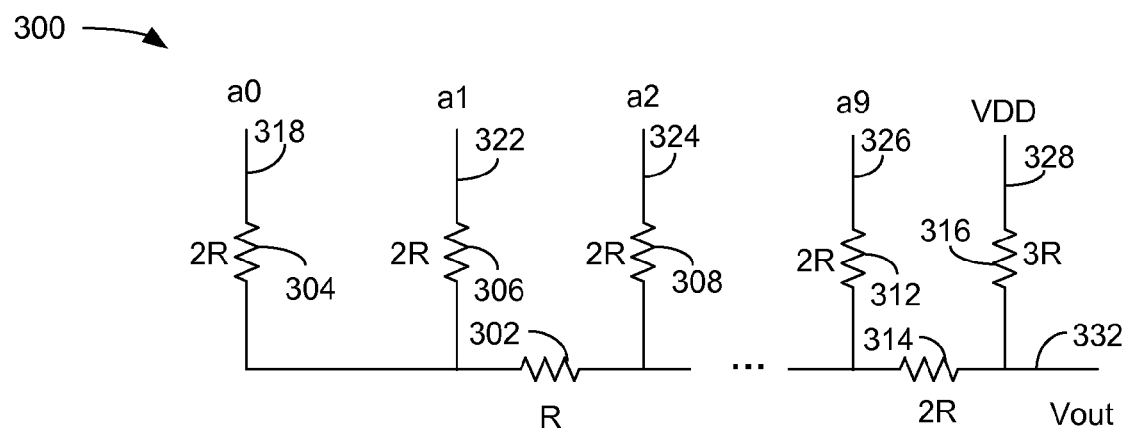
FIG. 5 is a schematic diagram illustrating an example 8 bit digital-to-analog converter (DAC) having an R2R architecture.

FIG. 5 is a schematic diagram illustrating an example 8 bit digital-to-analog converter (DAC) having an R2R architecture, where the 10b (a0-a9) are connected to the data stream and an 8b control word (VAL[7:0] described below) using bits a) through a7 makes it effectively an 8b DAC. The 8 bit DAC 300 comprises resistors 302, 304, 306, 308, 310, 312, 314 and 316, where the values of the resistor 302 is "R", the values for the resistors 304, 306, 308, 312 and 314 are "2R" and the value of the resistor 316 is "3R." A first bit "a0" (the LSB) is input on connection 318, a second bit "a1" is input on connection 322, a third bit "a2" is input on connection 326, and a $10^{th}$ bit "a9" (the MSB) is input on connection 326. A system voltage "VDD" is provided on connection 328 to the "3R" resistor 316 to provide a Vcm voltage of VDD·0.75. The value of Vout on connection 332 is given by:

Vout=(0.5*(8b_Dac/255)+0.5)*VDD

8b_Dac=0→0.5*VDD

8b_Dac=127→0.749*VDD

8b_Dac=255→1.0*VDD

Figure 6A:
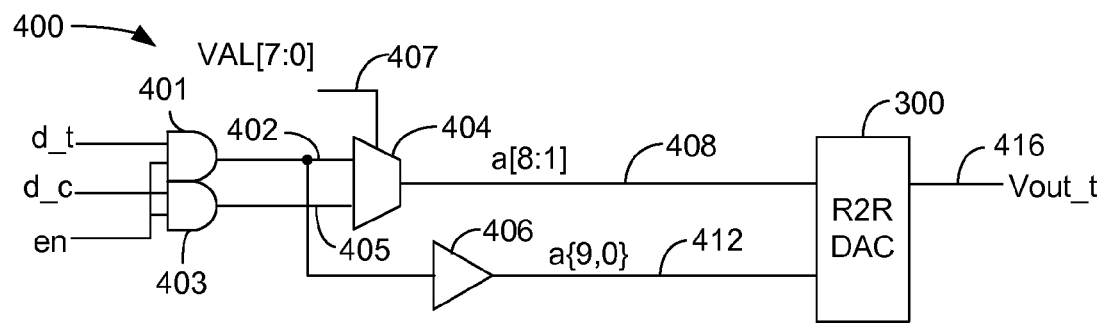
FIG. 6A is a logic block diagram illustrating the logic inputs to the example 8 bit digital-to-analog converter (DAC) having an R2R architecture of FIG. 5 to generate the "true" output of the DAC applicable to a PAM-2 communication methodology.

FIG. 6A is a logic block diagram illustrating the logic inputs to the example 8 bit digital-to-analog converter (DAC) having an R2R architecture of FIG. 5 to generate the "true" output of the DAC applicable to a PAM-2 communication methodology.

Complementary CMOS input signals "d_t" and "d_c" and an enable (en) signal are provided to logic gates 401 and 403, respectively. The signal "d_t" is the feedback signal on connection 172 (FIG. 3) and the signal "d_c" is the feedback signal on connection 174 (FIG. 3). The "d_t" output of the logic gate 401 and the "d_c" output of the logic gate 403 are provided to a multiplexer (MUX) 404. The "d_t" output of the logic gate 401 is also provided to a buffer 406 over connection 402. The multiplexer 404 also receives a control word, also referred to as a selection signal, having the values of bits 0 through 7 (VAL[7:0]) over connection 407. These are the bits a0 through a7 described above in FIG. 5.

The output of the MUX 404 on connection 408 are the bits a[8:1] and the output of the buffer 406 on connection 412 are the bits a{9:0}. These are provided to the DAC 300. The output of the DAC 300 on connection 416 is the adjustable value Vout_t and is provided to the HPF 160 (FIG. 3) over connection 166. The output of the DAC 300 is an analog DC voltage that is determined by the control word on connection 407. The programmable setting selected is the one that best matches the DC component received at the receiver elements 113 and 114. A bit-error-rate (BER) metric can be used to optimize the control word on connection 407.

Figure 6B:
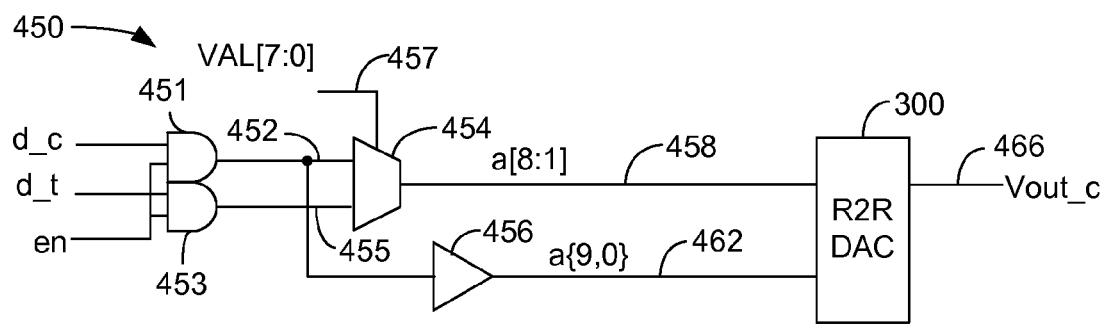
FIG. 6B is a logic block diagram illustrating the logic inputs to the example 8 bit digital-to-analog converter (DAC) having an R2R architecture of FIG. 5 to generate the "complement" output of the DAC applicable to a PAM-2 communication methodology.

FIG. 6B is a logic block diagram illustrating the logic inputs to the example 8 bit digital-to-analog converter (DAC) having an R2R architecture of FIG. 5 to generate the "complement" output of the DAC applicable to a PAM-2 communication methodology.

Complementary CMOS input signals "d_c" and "d_t" and an enable (en) signal are provided to logic gates 451 and 453, respectively. The signal "d_t" is the feedback signal on connection 172 (FIG. 3) and the signal "d_c" is the feedback signal on connection 174 (FIG. 3). The "d_c" output of the logic gate 451 and the "d_t" output of the logic gate 453 are provided to a multiplexer (MUX) 454. The "d_c" output of the logic gate 451 is also provided to a buffer 456 over connection 452. The multiplexer 454 also receives a selection signal having the values of bits 0 through 7 (VAL[7:0]) over connection 457. These are the bits a0 through a7 described above in FIG. 5.

The output of the MUX 454 on connection 458 are the bits a[8:1] and the output of the buffer 456 on connection 462 are the bits a{9:0}. These are provided to the DAC 300. The output of the DAC 300 on connection 466 is the value Vout_c and is provided to the HPF 160 (FIG. 3) over connection 167.

The output of the DAC 300 is an analog DC voltage that is determined by the control word on connection 457. The programmable setting selected is the one that best matches the DC component received at the receiver elements 113 and 114. A bit-error-rate (BER) metric can be used to optimize the control word on connection 457.

Figure 7A:
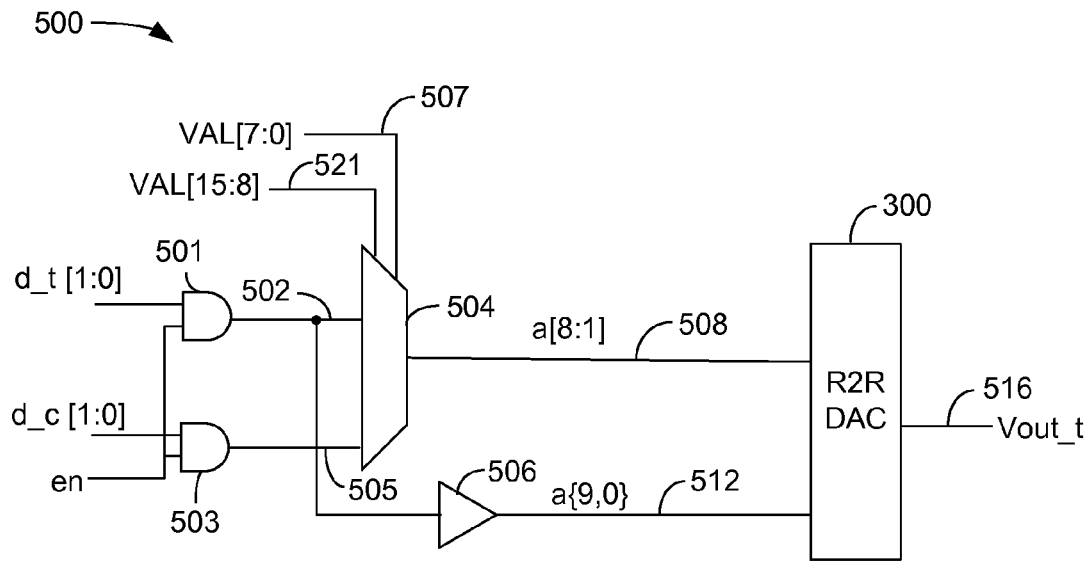
FIG. 7A is a logic block diagram illustrating the logic inputs to the example 8 bit digital-to-analog converter (DAC) having an R2R architecture of FIG. 5 to generate the "true" output of the DAC applicable to a PAM-4 communication methodology.

FIG. 7A is a logic block diagram illustrating the logic inputs to the example 8 bit digital-to-analog converter (DAC) having an R2R architecture of FIG. 5 to generate the "true" output of the DAC applicable to a PAM-4 communication methodology.

Complementary CMOS input signals "d_t[1:0]" and "dc [1:0]" and an enable (en) signal are provided to logic gates 501 and 503, respectively. The signal "d_t[1:0]" is the feedback signal on connection 172 (FIG. 3) and the signal "d_c [1:0]" is the feedback signal on connection 174 (FIG. 3). The nomenclature "[1:0]" for the "d_t" signal and the "d_c" signal denotes that each of these signals now comprises two bits, providing four possible logic values for each of the signals.

The "d_t[1:0]" output of the logic gate 501 and the "d_c [1:0]" output of the logic gate 503 are provided to a multiplexer (MUX) 504 over connection 502. The "d_t [1:0]" output of the logic gate 501 is also provided to a buffer 506 over connection 502. The multiplexer 504 receives a selection signal having the values of bits 0 through 7 (VAL[7:0]) over connection 507 and receives a selection signal having the values of bits 8 through 15 (VAL[15:8]) over connection 521. The addition of the selection signal having the values of bits 8 through 15 (VAL[15:8]) allows the multiplexer 504 to process the four states of each of the d_t [1:0] signal and the d_c [1:0] signal in a PAM 4 communication methodology.

The output of the MUX 504 on connection 508 are the bits a[8:1] and the output of the buffer 506 on connection 512 are the bits a{9:0}. These are provided to the DAC 300. The output of the DAC 300 on connection 516 is the value Vout_t and is provided to the HPF 160 (FIG. 3) over connection 166. The output of the DAC 300 is an analog DC voltage that is determined by the control words on connections 507 and 521. The programmable setting selected is the one that best matches the DC component received at the receiver elements 113 and 114. A bit-error-rate (BER) metric can be used to optimize the control words on connections 507 and 521.

Figure 7B:
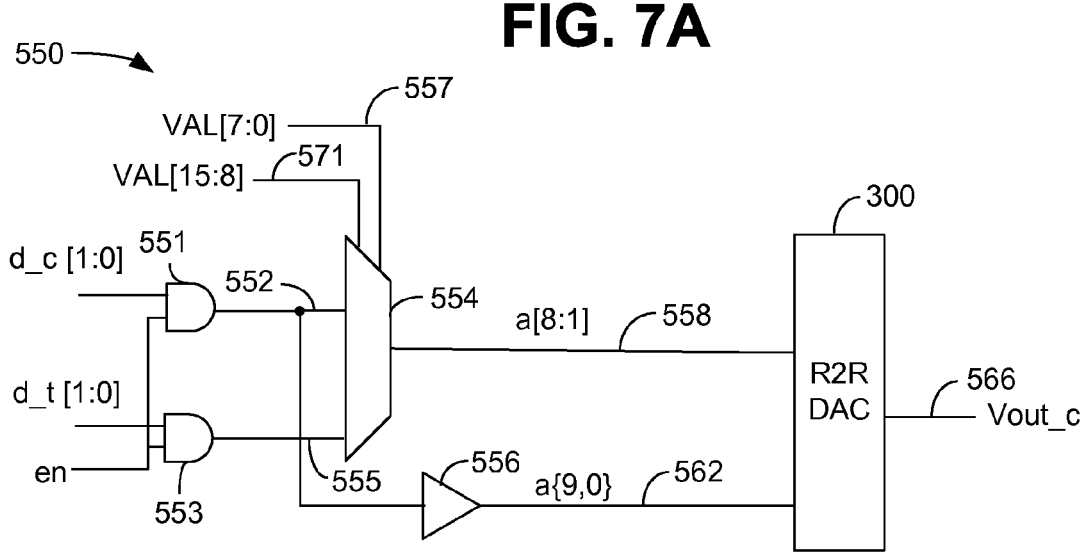
FIG. 7B is a logic block diagram illustrating the logic inputs to the example 8 bit digital-to-analog converter (DAC) having an R2R architecture of FIG. 5 to generate the "complement" output of the DAC applicable to a PAM-4 communication methodology.

FIG. 7B is a logic block diagram illustrating the logic inputs to the example 8 bit digital-to-analog converter (DAC) having an R2R architecture of FIG. 5 to generate the "complement" output of the DAC applicable to a PAM-4 communication methodology.

Complementary CMOS input signals "d_c[1:0]" and "d_t [1:0]" and an enable (en) signal are provided to logic gates 551 and 553, respectively. The signal "d_t[1:0]" is the feedback signal on connection 172 (FIG. 3) and the signal "d_c [1:0]" is the feedback signal on connection 174 (FIG. 3). The nomenclature "[1:0]" for the "d_c" signal and the "d_t" signal denotes that each of these signals now comprises two bits, providing four possible logic values for each of the signals.

The "d_c [1:0]" output of the logic gate 551 and the "d_t [1:0]" output of the logic gate 553 are provided to a multiplexer (MUX) 554 over connections 552 and 555, respectively. The "d_c [1:0]" output of the logic gate 551 is also provided to a buffer 556 over connection 552. The multiplexer 554 receives a selection signal having the values of bits 0 through 7 (VAL[7:0]) over connection 557 and receives a selection signal having the values of bits 8 through 15 (VAL [15:8]) over connection 571. The addition of the selection signal having the values of bits 8 through 15 (VAL[15:8]) allows the multiplexer 554 to process the four states of each of the d_c [1:0] signal and the d_t [1:0] signal in a PAM 4 communication methodology.

The output of the MUX 554 on connection 558 are the bits a[8:1] and the output of the buffer 556 on connection 562 are the bits a{9:0}. These are provided to the DAC 300. The output of the DAC 300 on connection 566 is the value Vout_c and is provided to the HPF 160 (FIG. 3) over connection 167. The output of the DAC 300 is an analog DC voltage that is determined by the control words on connections 557 and 571. The programmable setting selected is the one that best matches the DC component received at the receiver elements 113 and 114. A bit-error-rate (BER) metric can be used to optimize the control words on connections 557 and 571.

Figure 8:
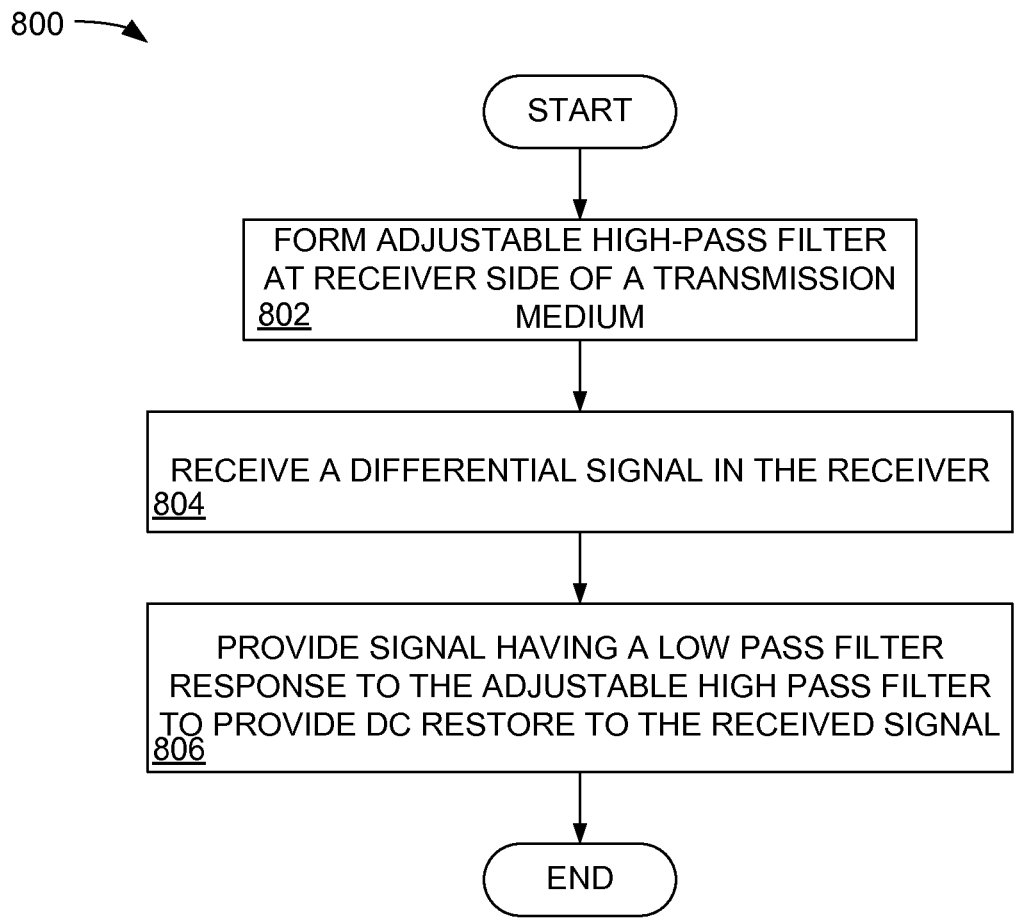
FIG. 8 is a flow chart describing an embodiment of a method for internal AC coupling with active DC restore and adjustable high-pass filter for a PAM 2/4 receiver.

FIG. 8 is a flow chart describing an embodiment of a method for internal AC coupling with active DC restore and adjustable high-pass filter for a PAM 2/4 receiver.

In block 802, an adjustable-pass filter (HPF) is formed in an integrated circuit at a receiver side of a transmission medium. The adjustable high-pass filter (HPF) comprises internal AC coupling capacitors and adjustable resistors.

In block 804, a differential signal is received in the receiver.

In block 806, a signal having a low-pass filter response is provided to the adjustable HPF to provide a DC restore function to the received signal.

This disclosure describes the invention in detail using illustrative embodiments. However, it is to be understood that the invention defined by the appended claims is not limited to the precise embodiments described.

What is claimed is:

1. A receiver termination circuit, comprising:
an internal AC coupling capacitor and an adjustable resistor forming an adjustable high-pass filter (HPF) at a receiver side of a transmission medium; and
a digital-to-analog converter (DAC) coupled to the adjustable HPF, the DAC configured to provide a signal having a low-pass filter response to the adjustable HPF to provide a DC restore function, wherein an RC characteristic of the adjustable HPF is adjustable by operation of the DAC and the adjustable resistor, and wherein the DC restore function provided by the DAC comprises digital feedback inserting receive data at frequencies in the range from DC to a high pass cutoff frequency set by an adjustable high-pass filter (HPF).

2. The circuit of claim 1, wherein the DAC provides a signal having an adjustable amplitude to the adjustable HPF.

3. The circuit of claim 2, wherein the DAC receives two logic level outputs as feedback signals.

4. The circuit of claim 3, wherein at least one of the two logic level outputs comprise a complementary metal oxide semiconductor (CMOS) level logic output.

5. The circuit of claim 1, wherein the low-pass filter response provided by the DAC and the high pass cutoff frequency are modulated together.

6. The circuit of claim 5, wherein the DAC is controlled by an eight bit control word to operate in a PAM 2 modality.

7. The circuit of claim 5, wherein the DAC is controlled by two eight bit control words to operate in a PAM 4 modality.

8. A method for operating a receiver circuit, comprising:
forming an adjustable-pass filter (HPF) at a receiver side of a transmission medium, the adjustable high-pass filter (HPF) comprising an internal AC coupling capacitor and an adjustable resistor that enables an RC characteristic of the adjustable HPF to be adjusted;
receiving a differential signal in the receiver; and
providing a signal having a low-pass filter response to the adjustable HPF to provide a DC restore function to the received signal, wherein the DC restore function comprises digital feedback inserting receive data at frequencies in the range from DC to a high pass cutoff frequency set by an adjustable high-pass filter (HPF).

9. The method of claim 8, wherein a digital-to-analog converter (DAC) provides a signal having an adjustable amplitude to the adjustable HPF.

10. The method of claim 9, wherein the DAC receives two logic level outputs as feedback signals.

11. The method of claim 10, wherein at least one of the two logic level outputs comprise a complementary metal oxide semiconductor (CMOS) level logic output.

12. The method of claim 9, further comprising modulating together the low-pass filter response provided by the DAC and the high pass cutoff frequency.

13. The method of claim 12, further comprising controlling the adjustable amplitude of the DAC using an eight bit control word to operate in a PAM 2 modality.

14. The method of claim 12, further comprising controlling the adjustable amplitude of the DAC using two eight bit control words to operate in a PAM 4 modality.

15. A receiver for a serializer/deserializer (SERDES), comprising:
   an internal AC coupling capacitor and an adjustable resistor forming an adjustable high-pass filter (HPF) at a receiver side of a transmission medium; and
   a digital-to-analog converter (DAC) coupled to the adjustable HPF, the DAC configured to provide a signal having a low-pass filter response to the adjustable HPF to provide a DC restore function, wherein an RC characteristic of the adjustable HPF is adjustable by operation of the DAC and the adjustable resistor, and wherein the DC restore function provided by the DAC comprises digital feedback inserting receive data at frequencies in the range from DC to a high pass cutoff frequency set by an adjustable high-pass filter (HPF).

16. The receiver of claim 15, wherein the DAC provides a signal having an adjustable amplitude to the adjustable HPF.

17. The receiver of claim 16, wherein the DAC receives two logic level outputs as feedback signals.

18. The receiver of claim 17, wherein at least one of the two logic level outputs comprise a complementary metal oxide semiconductor (CMOS) level logic output.

19. The receiver of claim 15, wherein the low-pass filter response provided by the DAC and the high pass cutoff frequency are modulated together.

20. The receiver of claim 19, wherein the DAC is controlled by an eight bit control word to operate in a PAM 2 modality.

21. The receiver of claim 19, wherein the DAC is controlled by two eight bit control words to operate in a PAM 4 modality.

* * * * *